United States Patent [19]

Simon

[11] 4,146,533

[45] Mar. 27, 1979

[54] REACTION PRODUCTS OF SHELLAC AND MONOEPOXIDES AS CO-REACTANTS FOR POLYISOCYANATES

[76] Inventor: Eli Simon, 7175 Little Harbor Dr., Huntington Beach, Calif. 92648

[21] Appl. No.: 906,675

[22] Filed: May 16, 1978

[51] Int. Cl.$^2$ .......................... C09F 1/04; C08L 93/02
[52] U.S. Cl. .................................... 260/97; 106/218; 260/24; 260/104
[58] Field of Search .......................... 260/97; 106/218; 260/24, 104

[56] References Cited

U.S. PATENT DOCUMENTS

| | | | |
|---|---|---|---|
| 3,197,422 | 7/1965 | Peterson et al. | 260/24 |
| 3,228,782 | 1/1966 | Skeist et al. | 260/97 |
| 3,267,088 | 8/1966 | Cockeram | 260/24 |

*Primary Examiner*—H.S. Cockeram

[57] ABSTRACT

The new compounds of this invention, reactive with isocyanates, are comprised of reaction-products of shellac and monoepoxides. The epoxidation of the shellac is conducted within the temperature range of 90° to 120° C. under reflux conditions for approximately six hours. The properties are modified in the epoxy equivalent weight, the acid number, and in the solvency characteristics as compared to the unreacted monoepoxide and shellac. It is in part the change in the nature of the active solvents for the shellac-monoepoxide products that influences their effective utilization as co-reactants with polyisocyanates.

The preferred ratios of shellac to monoepoxide fall within the range of 1 to 2 epoxide equivalents of the monoepoxide, or approximately 1 to 2 monoepoxide g-molecular weights to 700 grams of shellac. Reaction with polyisocyanates may be conducted at room temperature or accelerated by elevating the temperature, such as up to 100° C.; the cured products are transparent, bubble-free, flexible even in thick sections, adherent, tough and abrasion-resistant, having application as coatings, sealants, and caulking compounds.

2 Claims, No Drawings

REACTION PRODUCTS OF SHELLAC AND MONOEPOXIDES AS CO-REACTANTS FOR POLYISOCYANATES

BACKGROUND AND PRIOR ART

Shellac is defined in the 7th edition of the Merck Index as a "resinous secretion of the insect Laccifer(Tachardia) lacca Kerr, order Homptera, family Coccidae". The lac insects in feeding upon the vegetable sap of trees exude the lac resin which is then recovered in crude form from the encrusted twigs; purification by washing, melting and straining yields the orange shellac, a form commonly marketed and used by industry. Bleached shellac may be made from orange shellac by bleaching an aqueous alkaline solution followed by precipitation from solution with a dilute acid, such as sulfuric acid; additionally, if dewaxing is desired, it can be accomplished prior to the bleaching step.

Shellac, historically, has enjoyed usage as components or organic molding compounds, as resinous binder for laminated forms, for electrical insulating components, and as coatings from alcoholic solutions and aqueous emulsions. However, the application of shellac as coreactants have been limited by its restriction in the types of compounds most effective as solvents. It is an object of this invention to expand the applications beyond the conventional uses to include the utilization of isocyanates as curing agents; in attaining this objective, shellac is modified to alter its solubility from alcoholic to include ketone and estertype solvents, while maintaining functional group characteristics reactive with isocyanates.

Although knowledge as to the structure of shellac is still incomplete, data has been gathered, particularly in recent times, that represents major contributions to our understanding of its fundamental nature. Supplementing the elucidation of structure, functional group and physical constant information, which are readily obtained, is additionally useful in explaining the rationale of my invention; thus, by knowing the acid and hydroxyl numbers, calculations can indicate the average number of carboxylic acid and hydroxyl groups per given weight of shellac, forming the basis for establishing weight-to-weight relationships for the modified shellac reactants and the polyisocyanate curing agents.

DESCRIPTION OF THE INVENTION

Shellac in its varios forms, ie., orange, refined, bleached, dewaxed and bleached, is thermally reacted with a monoepoxide having a weight per epoxide from approximately 120 to 300. Illustrative of applicable monoepoxides are: butyl glycidyl ether; phenyl glycidyl ether; cresy glycidyl ether; p-butyl phenol glycidyl ether; and Procter and Gamble's Epoxide #7,

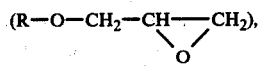

an alkyl monoepoxide having a reported typical weight per epoxide of 229 and in which the alkyl groups are predominantly n-octyl and n-decyl. The epoxidation serves the purposes of: modifying the solubility properties of the original shellc, changing it from one primarily soluble in the lower molecular weight alcohols to a product that maintains solubility in the same alcohols, such as ethanol, but now includes ready solubility to a minimum of 20 weight percent at 20°–25° C. in methyl ethyl ketone as well as equivalent or greater solubility in tetrahydrofuran; and acting as a scavenging agent for carboxylic acid groups, converting the carboxyl group to a hydroxyl group by addition esterification, having the net effect of maintaining labile hydrogen functionality while reducing the liberation of carbon dioxide when reacted with isocyanates as curing agents.

Evidence that the change is the expanded solubility characteristics of the treated shellac is caused by a structural modification as a result of the epoxidation, rather than the result of a physical mixing of the two components is apparent by the marked reduction in the free oxirane of the monoepoxide fraction and a lowering of the acid number of the shellac fraction after thermal processing. That the curing effect by isocyanate is due to interaction with the functional groups of the modified shellac rather than reaction with free oxirane can easily be demonstrated by noting the apparent absence of reaction between tolylene diisocyanate and Procter and Gamble's monoepoxide, ie., Epoxide #7, both at ambient temperature and an elevated temperature of 100° C.

The chemical modification of shellac is accomplished by heating it with an applicable monoepoxide at a temperature from 90° C. to 120° C., under reflux, for 4 to 8 hours with periodic stirring at the melt condition. Generally, six hours at 100° C. is sufficient to convert the mixture to a homogeneous product, varying in consistency depending on the weight percent of the shellac, having expanded solubility to include in particular the solvent methyl ethyl ketone: concomitantly, polyisocyanates most suitable as curing agents are those also soluble in both methyl ethyl ketone and tetrahydrofuran.

Illustrative polyisocyanates are those including the tolylene diisocyanates, the Upjohn Company's polymethylene polyisocyanates having isocyanate contents by weight of 30 to 31.5%, Mobay Company's DESMODUR E-21 polyisocyanate prepolymer aromatic type having an average NCO content of 16%, diphenylmethane 4,4'-diisocyanate, 3,3'-bitolylene 4,4'-diisocyanate, dianisidine diisocyanate, and polyisocyanate prepolymers comprised of polyisocyanates and diols containing from 5 to 25 weight percent isocyanate.

Polyisocyanate-treated shellac-monoepoxide reaction products cure readily at ambient temperatures, becoming tack-free within approximately one hour after application; curing continues at ambient temperature, which can be accelerated by elevating the temperature, to yield transparent, bubble-free, very tough, adherent, flexible products. Tetraethyl orthosilicate is also effective as a curing agent, indicating an extension of the reaction mechanism of the modified shellac products of this invention. The relationship between the curing agents and the chemically-modified shellac is based on a ratio of the respective functional groups, approximating 1:1, arrived at for the shellac-monoepoxide products by calculation from the hydroxyl and acid numbers of the original shellac; the calculation provides a weight per functional group which can then be used to determine the optimum requirement for polyisocyanate. The examples to follow will identify and expand on some of these considerations.

EXAMPLES OF THE INVENTION

Example 1

Shellac-monoepoxide products of this invention were prepared by heating aliquots of various ratios of the components, as note in Table #I following, at 90° to 100° C. for approximately six hours. All were readily soluble in both methyl ethyl ketone and tetrahydrofuran. The consistency of the reaction products varied from a tough, semi-hard material with very slight tack for Product numbers 1 and 5, to semi-tacky and gum-like for Product #2, and soft, plastic and tacky for Product Numbers 3 and 4. The refined shellac (in Table #I) is identified as dewaxed and bleached, having an acid number of about 80 and an average hydroxyl number of about 235. Epoxide #7, previously referenced as Procter and Gamble's monoepoxide, is identified (in Table#I) as having an epoxide equivalent of approximately 228.

Table #I

| | "Shellac-Epoxide #7 Reaction Products" | | | |
|---|---|---|---|---|
| Product Number | Refined Shellac | Orange Shellac | Epoxide #7 | Additive Weights |
| 1 | 700 g. | — | 228 g. | 928 g. |
| 2 | 700 g. | — | 456 g. | 1156 g. |
| 3 | 700 g. | — | 684 g. | 1384 g. |
| 4 | 700 g. | — | 912 g. | 1612 g. |
| 5 | — | 700 g. | 279 g. | 979 g. |

Solutions of the reaction products were prepared containing approximately 25 weight percent "product" in methyl ethyl ketone, tetrahydrofuran, and mixed solvents of methyl ethyl ketone and tetrahydrofuran. Aliquots were mixed with 2,4 tolylene diisocyanate in the ratio of ¼ of the additive product weights to ½ mol tolylene diisocyanate, as shown in Table #II.

Table #II

| | "Shellac-Epoxide #7/TDI Ratios" | |
|---|---|---|
| Product Number | Product Weight | Tolylene Diisocyanate Weight |
| 1 | 732 g. | 87 g. |
| 2 | 289 g. | 87 g. |
| 3 | 346 g. | 87 g. |
| 4 | 403 g. | 87 g. |
| 5 | 245 g. | 87 g. |

All air-cured tack-free to transparent, bubble-free, adherent, tough and flexible coatings. Heating for one hour at 100° C. reduced the time period for attaining its final cured state. As an indicator of insolubilization, the cured coatings were wiped with acetone; of these, cured Product #3 became slightly tacky, cured Product #4 could be removed, and cured Products 1 & 2 were unaffected, indicating a preference for restricting the ratio of shellac to monoepoxide to a maximum of about 2 equivalents of the monoepoxide per 700 g. shellac.

Comparison was made between tolylene diisocyanate(TDI)-cured "Product" coatings and one from a commercial 3# cut of clear shellac for resistance to a 3% solution of sodium chloride in distilled water. Each was applied to aluminum substrates of the same composition; after 7 days immersion, following air-curing for 24 hours, none of the isocyanate-compositions appeared adversely affected, whereas the shellac control showed marked loss of adhesion. Outdoor exposure, with daily wetting by tap water, substantiated the superiority of the TDI-cured shellac-Epoxide#7 coatings.

Example 2

This example is an extension of the mechanism-of-cure between isocyanates and the shellac-monoepoxide reaction products by demonstrating that tetraethyl orthosilicate is also effective as a co-reactant. Product #1 of Example 1 was mixed at ambient temperature with tetraethyl orthosilicate in the ratio of their "molecular" weights, or 928 g. of Product #1 to 208 g. of tetraethyl orthosilicate, approximating respectively equal functional groups. The procedure comprised taking an aliquot of a 22 wt.% solution in methyl ethyl ketone of Product #1 and adding to it the required weight of tetraethyl orthosilicate. After aging overnight at an ambient temperature of about 20° C., the film had slight residual tack, was transparent, tough, adherent, and flexible; post-heating at approximately 100° C. eliminated the surface tack, and increased its toughness and abrasion-resistance without impairing its flexibility, even in thick sections.

Example 3

Mobay Chemical Company's DESMODUR E-21 (a polyisocyanate prepolymer aromatic type having an average NCO content of 16% and an average equivalent weight of 262) was used as a curing agent for Product #1 of Example 1 in the ratio of 1-equivalent weight of DESMODUR E-21 (or 262 g.) to ¼ the "additive" weight of Product #1 (or 232 g.). In this process, to an aliquot of a 28.4 wt.% solution of Product #1 in tetrahydrofuran was added a weight of DESMODUR E-21 corresponding to the ratio of 262 g.DESMODUR E-21:232 g.Product #1. After mixing at ambient temperature, the solution was transferred to a shallow container; within one hour, at 20°-25° C. the film was tack-free, bubble-free, transparent, adherent, tough, and flexible even in thick sections. Continued curing at ambient temperature for 24 hours improved the toughness and abrasion-resistance without any evidence of impairment in flexibility.

Example 4

In this example, a synthesized isocyanate prepolymer was used as a curing agent for Product #1 of Example 1. The prepolymer was prepared by reacting for one hour at 100° C. equivalent fractions of the following components: 221 g. Union Carbide's NIAX polypropylene glycol 425, having a hydroxyl number of 254; 786 g. DESMODUR E-21, of Example 3; and 261 g. 2,4 tolylene diisocyanate. As in the procedure in Example 3, an aliquot of the isocyanate prepolymer was was added to a tetrahydrofuran solution of Product #1 in the ratio of 1-equivalent weight of the synthesized isocyanate prepolymer (or 254 g.) to ¼ of the additive weight of Product #1 (or 232 g.). The deposit from the mixed solution cured within one hour at ambient temperature tack-free, bubble-free, transparent, adherent, tough and flexible. Aging overnight at 20°-25° C., or heating for approximately one hour at about 100° C., increased the physical strength properties without adversely affecting its flexibility, even in thick sections.

Example 5

This example illustrates the application of isocyanate-cured modified shellac products as caulking compounds and sealants. An 85 wt.% solution of Product #2 from Example 1 in mixed methyl ethyl ketone-tetrahydrofuran solvents was prepared by concentrating a 25 wt.% solution. To the concentrate was added an aliquot of DESMODUR E-21 of Example 3 corresponding to 1-equivalent weight isocyanate (or 262 g.) for ¼ the additive weight of Product #2 (or 289 g.) and sufficient titanium dioxide to provide approximately 40 wt. percent pigment based on the total solids. The components were mixed to a smooth, thickened paste which cured tack-free and flexible within ¼ hour at ambient temperature; curing continued overnight at ambient temperature resulting in improved toughness without sacrifice of flexibility. Also, the cure could be accelerated by heating for approximately one hour at 100° C.

Example 6

In this example, the processing temperature for Product #1 of Example 1 was controlled at 100° C. for 6 hours each. The resultant reaction products were similar in physical characteristics, solubility in solvents, and reactivity with polyisocyanates. Epoxide equivalents, by the "Pyridinium Chloride Method" (reference, "Handbook of Epoxy Resins" by Lee & Neville, 1967), after compensating for residual carboxyl, separately determined, showed a value of approximately 5700 for Product #1 processed at 100° C. and a value of approximately 12,000 when processed at 120° C. Each is substantially greater than the calculated epoxide equivalent of about 927 for a physical mixture of the same weight ration of shellac and Epoxide #7, substantiating the conclusion that the marked change in solubility characteristics is due to a chemical reaction between the shellac and monoepoxide. Also, the approximate 2:1 value in epoxide equivalents between the 120° C. & 100° C. temperatures, respectively, without any noticeable change in performance properties, is indicative of the permissible latitude in the reaction conditions, provided that solubility is maintained in methyl ethyl ketone and tetrahydrofuran, estimated as a minimum of 20 weight percent.

Example 7

In this example, comparison is made for the resistance to weathering between shellac and tolylene diisocyanatecured shellac-monoepoxide reaction products (Product numbers 1 & 2 of Example 1) applied to wood, aluminum alloy, and iron substrates. The shellac is identified as a commercial alcoholic solution of a 3-lb. cut; the tolylene diisocyanate-Product 1 & 2 coatings were prepared as noted in Example 1 and cured at ambient temperature.

In the preparation of the test specimens: two coats were applied to the wood surfaces, the second after lightly sanding the coatings that had aged overnight at ambient temperature; for the the aluminum alloy and iron test specimens, one coat was applied to each surface, that had been acetone-cleaned, and allowed to set at ambient temperature for 24 hours prior to the start of the environmental exposure.

After extended outdoor weathering, with daily wetting by tap water, the following observations were made:

For the wood test specimens, the shellac coatings had reduced gloss, in contrast to the excellent gloss-retention of the TDI-cured shellac-monoepoxide reaction products; neither showed the obvious failures of checking, powdering, or loss of adhesion.

For the aluminum alloy test specimens, there was a significant difference between the shellac surface and those of this invention; the shellac showed loss of gloss, spotting and an opacified appearance, whereas those cured with TDI had good gloss-retention and evidenced little staining.

For the iron alloy test specimens, the differences were less marked, but the shellac appeared less protective as indicated by the more extended development of rust-coloration under the surface film.

In each case, there was a consistent improvement in performance for "shellac-type" coatings if the shellac is modified with a monoepoxide and its reaction products are cured with a polyisocyanate.

I claim:

1. Polyisocyanate-cured products of shellac-monoepoxide reactants in which the shellac-monoepoxide products are prepared by reacting on a weight basis 700 parts of shellac with one to two mols of a monoepoxide having a molecular weight of from 120 to 300 for 4 to 8 hours at 90° to 120° C.

2. Polyisocyanate-cured producrts of shellac-monoepoxide reactants of claim 1 in which the monoepoxide of the shellac-monoepoxide products is an aliphatic glycidyl ether containing primarily n-octyl and n-decyl alkyl groups and having a weight per epoxide of from 225 to 235.

* * * * *